Patented Dec. 1, 1942

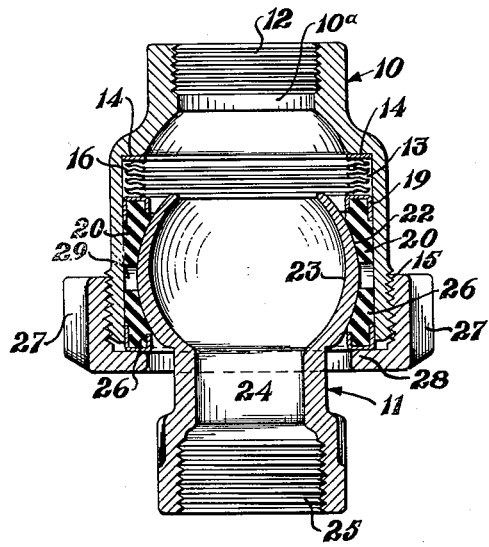
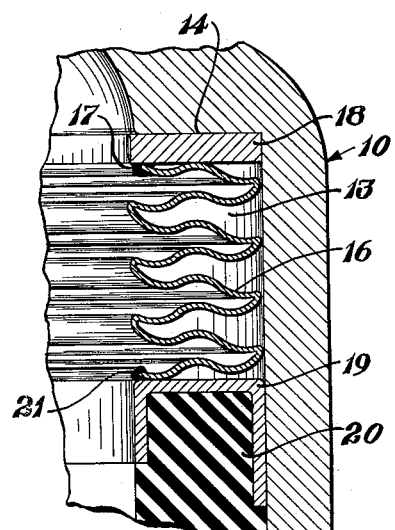
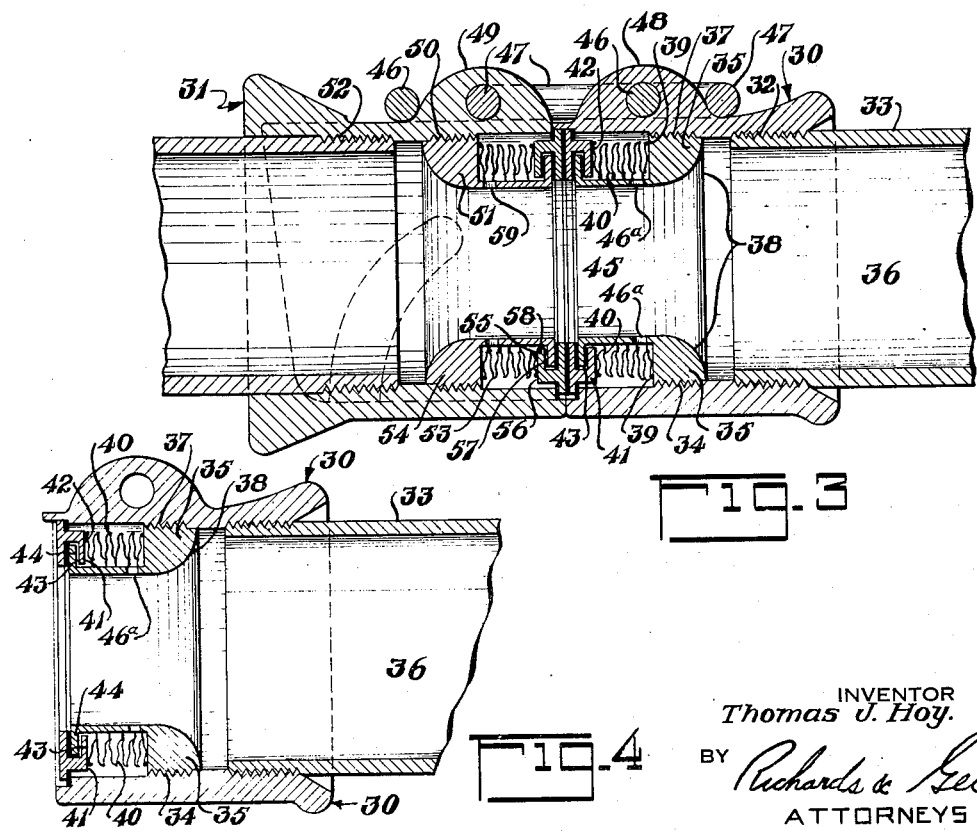

2,303,642

UNITED STATES PATENT OFFICE 2,303,642

PRESSURE SEALED COUPLING

Thomas J. Hoy, Newark, N. J.

Application December 23, 1940, Serial No. 371,219

2 Claims. (Cl. 285—90)

This invention relates to couplings and, more particularly, the sealing by means of pressure of the coupling, or joint, in a line carrying fluid or gases under pressure.

In the past, devices of this character, through wear of the gaskets used to seal the same, would leak after a certain amount of usage. Wear of the gaskets is generally taken up by use of adjusting nuts or springs which requires not only close inspection but additional labor to keep the coupling, or joints, in a leak-proof condition.

It is an object of the present invention to provide a joint, or coupling, in a line carrying fluid or gases under pressure, which joint, or coupling, is sealed against leakage by means of the pressure carried in said line.

Another object of the invention is to provide a joint in a line carrying fluid or gases which is sealed against leakage by means of pressure, the joint being simple and inexpensive to produce and easy to assemble.

A further object of this invention is to provide a positive sealing means for pipe and hose couplings which comprises a metallic bellows responsive to the pressure in said pipe or hose and adapted to exert a force on the sealing surfaces of the coupling, or joint, proportional to the pressure.

Other objects of this invention will become apparent in the course of the following specification.

The above and other objects of this invention are accomplished by providing a joint, or coupling, in a line carrying a fluid or gas under pressure, having a sealing gasket in one member of said coupling and adapted to bear against the other member thereof, a metallic bellows positioned within one member of said coupling and responsive to the pressure in said line, one end of said bellows bearing against one member of the coupling and the opposite end bearing against said sealing gasket, whereby pressure within said bellows will cause the same to exert force against the gasket, pressing the same tightly against the other member of said coupling.

The invention will appear more clearly from the following detailed description when taken in connection with the accompanying drawing, showing by way of example an embodiment of the invention, together with a possible modification thereof.

In the drawing:

Figure 1 is a sectional view through the central portion of a ball and socket coupling embodying this invention;

Figure 2 is an enlarged sectional view of pressure exerting sealing means of this invention;

Figure 3 is a sectional view of a hose coupling embodying the invention, the members of said coupling being shown together; and Figure 4 is a sectional view of a member of the coupling containing the pressure sealing means.

Referring to Figures 1 and 2 of the drawing, the reference numeral 10 designates the socket member, and the numeral 11 the ball member of a ball and socket joint for use in a pipe line or hose used for conveying a fluid or gas.

The member 10 has screw threads 12 within a passage 10a adapted to receive a screw-threaded pipe, or hose, fitting on the reduced end thereof. The opposite end thereof is enlarged to form a chamber 13 therein, a shoulder portion 14 being formed between the enlarged and reduced portions of the member 10. Adjacent the end of the enlarged portion of the member 10 on the exterior thereof are threads 15.

Adapted to be positioned within the chamber 13 is a pressure sealing means comprising bellows 16 adapted to be expanded by means of fluid or gases passing through the chamber 13 under pressure. The bellows are, preferably, constructed of flexible metal, as shown in Fig. 2 of the drawing, but, of course, may be constructed of hard rubber or any other suitable material. As shown in detail in Figure 2 of the drawing, one end of the bellows may be welded at 17 to a washer 18 which is adapted to bear against the shoulder 14. The opposite end of the bellows 16 may be welded at 21 to the metal sheath 19 on a sealing gasket 20. It will be readily understood, however, that the bellows 16 may be positioned between the shoulder 14 and gasket 20 without welding. In assembling the device of this invention, it has been found most convenient to weld the bellows to the washer and gasket, so that the washer 18, bellows 16, and gasket 20 may be positioned in the chamber 13 as a unit.

The gasket 20 is adapted to bear against the outer surface 22 on the innermost end of the ball portion 23 on the ball member 11 of the joint. The ball member 11 has a passage 24 therethrough, threaded at 25 to receive a pipe, or hose, fitting.

Positioned within the enlarged portion at the end thereof is a sealing gasket 26 adapted to bear against the surface 22 at the outermost end of said ball portion 23.

An adjusting nut 27 positioned on the threads 15, and having an extension 28 bearing against the gasket 26, is used to tighten the gasket against the surface 22.

A space 29 between the gaskets 20 and 26 may be used to contain a lubricant for the joint.

In the embodiment of the invention illustrated in Figures 1 and 2 pressure passing through the joint composed of the ball and socket members 11 and 10 will cause the bellows 16 to expand, pressing the gasket 20 firmly against the outer surface 22 of the ball 23, providing a constant pressure sealing force acting upon the sealing gasket 20, this sealing force increasing in proportion to the pressure within the joint and line to which it is attached.

Referring to Figures 3 and 4 of the drawing, a coupling for a hose line, comprising two members 30 and 31, adapted to be joined and disjoined is illustrated. One member 30 is screw-threaded internally on one end thereof at 32 to receive a hose fitting 33.

The member 30 is also screw-threaded internally at 34 to receive a cage 35 which is of lesser diameter than the inside diameter of the passage 36 through the coupling, the cage 35 having a screw-threaded flange 37 to engage the threads at 34 in the coupling. The flange 37 forms a shoulder 38 to which is welded at 39 one end of a metallic bellows 40. The opposite end of the bellows 40 is welded to a resilient sealing gasket 41 having a metal sheathed face 42. The gasket 41 has a recess 43 therein adapted to receive a flange 44 on the cage 35.

The cage 35 has a passage 45 through the center thereof, the passage being in communication with the bellows 40 through the apertures 46a.

The members 30 and 31 of the coupling are locked together by means of locking bars 46 and 47. The locking bar 46 is pivotally mounted at one end in the projection 48 on the member 30, the other end being adapted to engage the projection 49 on the member 31. Likewise, the locking bar 47 is pivoted in the projection 49 and engages the projection 48.

The member 31 is preferably constructed similar to the member 30 also being threaded internally at 50 to receive a cage or seat 51 having a screw-threaded flange 52. A metallic bellows 53 is seated on the shoulder 54 the opposite end being attached to a resilient sealing gasket 55 having a metal face 56. The gasket 55 has an annular recess 57 therein adapted to receive a flange 58 on the cage 51. The bellows 53 are preferably welded to the metal face 56 on the gasket 55 and to the shoulder 54 so that the same may be readily inserted in the member 31. It is possible, however, to insert these parts in the member 31 independently if so desired. The same is true of the bellows 40, cage 35, and gasket 41. Apertures 59 provide a communication between the bellows 53 and the fluid pressure in the line.

Pressure in a line coupled by the members 30 and 31 acts upon the bellows 40 through the apertures 46a and upon the bellows 53 through the apertures 59 causing the bellows to expand toward one another in proportion to the pressure in the line. This action presses the sealing gaskets 41 and 51 into tight engagement preventing leakage in the coupling between the two members 30 and 31.

It is apparent that the specific illustration shown has been given by way of illustration and not by way of limitation and that the structure above described is subject to a wide variation and modification without departing from the scope or intent of the invention, all of which variations and modifications are to be included within the scope of the present invention.

What is claimed is:

1. The combination with a pair of interlocking end members; a bearing shoulder formed in one of said end members, and a sealing member engaging the other one of said end members; of an intermediate, resilient, metallic bellows having one end engaging said bearing shoulder and firmly connected therewith, and another end firmly connected with said sealing member, said bellows normally being preloaded to exert pressure in opposite directions and being responsive to pressure or heat to increase the force exerted on said head and said seat, respectively, and restraining means for said metallic bellows for controlling and predetermining the forces exerted thereby.

2. In a coupling for a line for carrying fluid under pressure having a female end member having a bearing shoulder formed therein and a male end member, said male end member including a ball received within said female member, a gasket engaging said ball for retaining said male member in said female member, sealing means in said female member comprising another gasket adapted to engage the outer surface of said ball and a resilient bellows engaging said other gasket and said bearing shoulder, said bellows normally being preloaded to exert pressure in opposite directions and being responsive to pressure or heat to increase the force exerted on said female member and said sealing gasket, respectively, and an adjusting nut supporting the first-mentioned gasket and carried by said female end member.

THOMAS J. HOY.